(12) United States Patent
Börger

(10) Patent No.: US 9,334,607 B2
(45) Date of Patent: May 10, 2016

(54) METHOD AND DEVICE FOR PRODUCING A COMPOSITE FIBER MATERIAL IN THE FORM OF A FIBER STRIP IMPREGNATED WITH A POLYMER

(75) Inventor: Herbert Börger, Langenfeld (DE)

(73) Assignee: Thermoplast Composite GmbH, Langenfield (DE)

( * ) Notice: Subject to any disclaimer, the term of this patent is extended or adjusted under 35 U.S.C. 154(b) by 422 days.

(21) Appl. No.: 14/004,270

(22) PCT Filed: Mar. 7, 2012

(86) PCT No.: PCT/EP2012/053866
§ 371 (c)(1),
(2), (4) Date: Nov. 1, 2013

(87) PCT Pub. No.: WO2012/123302
PCT Pub. Date: Sep. 20, 2012

(65) Prior Publication Data
US 2014/0050862 A1 Feb. 20, 2014

(30) Foreign Application Priority Data

Mar. 11, 2011 (DE) .......................... 10 2011 005 462

(51) Int. Cl.
*D06M 10/10* (2006.01)
*D06M 10/02* (2006.01)
*B29B 15/12* (2006.01)
(Continued)

(52) U.S. Cl.
CPC ............. *D06M 10/10* (2013.01); *B29B 15/122* (2013.01); *B29C 70/50* (2013.01); *D06M 10/02* (2013.01); *B29C 70/20* (2013.01)

(58) Field of Classification Search
CPC ... D06M 15/705; D06M 15/70; D06M 10/02; D06M 10/10; B29B 15/122
See application file for complete search history.

(56) References Cited

U.S. PATENT DOCUMENTS 3,422,796 A 1/1969 Baber
3,873,389 A 3/1975 Daniels
3,993,726 A 11/1976 Moyer
(Continued)

FOREIGN PATENT DOCUMENTS

DE 25 07 675 A1 9/1976
EP 0 397 506 A2 11/1990
(Continued)

*Primary Examiner* — Joel Horning
(74) *Attorney, Agent, or Firm* — McGlew and Tuttle, P.C.

(57) ABSTRACT

A device for producing a composite fiber material in the form of a fiber band impregnated with a polymer includes a transport device for supplying and for transporting a fiber band along a processing path. To preheat the raw fiber band to a processing temperature a preheating device is used. An application device is used for applying the melted polymer on the whole width onto the surface of the raw fiber band. At least one pressure shearing vibration application device is used to apply pressure to the raw fiber band perpendicular to the band plane after the application of the polymer, where the application of pressure is performed by at least one pressure stamp with the simultaneous shearing vibration of the pressure stamp by a vibration movement component (y) in the band plane and transversely to a band running direction. At least one tempering device is used to keep the raw fiber band within a processing temperature range. This results in a production method and a production device with a predefined impregnating quality at the lowest possible production cost.

14 Claims, 6 Drawing Sheets

(51) Int. Cl.
*B29C 70/50* (2006.01)
*B29C 70/20* (2006.01)

(56) References Cited

U.S. PATENT DOCUMENTS

| | | | |
|---|---|---|---|
| 4,059,068 A | 11/1977 | Guillermin et al. | |
| 4,300,878 A | 11/1981 | Ible | |
| 4,588,538 A | 5/1986 | Chung et al. | |
| 5,158,806 A | 10/1992 | Unger | |
| 5,376,402 A * | 12/1994 | Louks | B05C 11/023 118/712 |
| 5,798,068 A | 8/1998 | Vlug | |
| 6,656,316 B1 * | 12/2003 | Dyksterhouse | B29B 15/122 156/285 |
| 7,571,524 B2 | 8/2009 | Kawabe et al. | |
| 8,316,906 B2 | 11/2012 | Prokschi et al. | |
| 2005/0221085 A1 | 10/2005 | Lo et al. | |

FOREIGN PATENT DOCUMENTS

| | | |
|---|---|---|
| GB | 1 498 552 A | 1/1978 |
| JP | 62 073916 A | 4/1987 |
| JP | 2 688 845 B2 | 2/1991 |
| JP | 03 251 408 A | 11/1991 |
| JP | 10 166362 A | 6/1998 |
| JP | 03 146777 A | 5/2003 |
| JP | 2007-076224 A | 3/2007 |
| JP | 2007246782 A | 9/2007 |
| JP | 2008-246782 A | 10/2008 |
| WO | 2009/074490 A1 | 6/2009 |

* cited by examiner

METHOD AND DEVICE FOR PRODUCING A COMPOSITE FIBER MATERIAL IN THE FORM OF A FIBER STRIP IMPREGNATED WITH A POLYMER

CROSS REFERENCE TO RELATED APPLICATIONS

This application is a United States National Phase Application of International Application PCT/EP2012/053866 filed Mar. 7, 2012 and claims the benefit of priority under 35 U.S.C. §119 of German Patent Application, Serial No. 10 2011 005 462.6 filed Mar. 11, 2011, the entire contents of which are incorporated herein by reference.

FIELD OF THE INVENTION

The invention relates to a method and a device for producing a composite fiber material in the form of a fiber band impregnated with a polymer.

BACKGROUND OF THE INVENTION

Methods and devices for processing or producing a fiber band are known from JP 2 688 845 B2, JP 03 146777 A, JP 03 251 408 A, WO 2009/074490 A1, US 2005/0221085 A1, JP 2007-076224 A, JP 2008-246782 A, U.S. Pat. No. 3,422,796 A, U.S. Pat. No. 4,059,068 A, EP 0 397 506 A2, U.S. Pat. No. 5,798,068 A, U.S. Pat. No. 4,588,538 A, U.S. Pat. No. 3,873,389 A, U.S. Pat. No. 3,993,726 A, DE 25 07 675 A1, U.S. Pat. No. 4,300,878 A and U.S. Pat. No. 7,571,524 B2.

SUMMARY OF THE INVENTION

An objective of the present invention is to develop a method and a device of the aforementioned kind such that a fiber band is impregnated with a predefined impregnation quality at the lowest possible production cost.

Said objective is achieved according to the invention by a method for producing a composite fiber material in the form of a fiber band impregnated with a polymer comprising the following steps:
  providing a raw fiber band and conveying the raw fiber band along a processing path,
  preheating the raw fiber band to a processing temperature which is higher than a melting point of the polymer,
  applying the melted polymer to the whole width of the raw band on a surface of the raw fiber band,
  applying pressure to the raw fiber band perpendicular to the plane of the band after applying the polymer, wherein the pressure is applied by at least one pressure stamp with the simultaneous application of shearing vibration of the pressure stamp having a vibration movement component (y) in the band plane and transversely to a band running direction,
  keeping the raw fiber band within a processing temperature range above the polymer melting point at least until the completion of the pressure-shearing vibration.

Said objective is further achieved by a device for producing a composite fiber material in the form of a fiber band impregnated with a polymer comprising:
  a transport device for supplying a raw fiber band and for transporting the fiber band along a processing path,
  a preheating device for preheating the raw fiber band to a processing temperature which is higher than a melting point of the polymer,
  an application device for applying the melted polymer onto the whole width of the raw fiber band on a surface of the raw fiber band,
  at least one pressure shearing vibration application device which comprises at least one pressure stamp for the application of pressure onto the raw fiber band perpendicular to the band plane after the application of the polymer by the pressure stamp with the simultaneous application of the shearing vibration of the pressure stamp having a vibration movement component (y) in the band plane and transversely to a band running direction, wherein the raw fiber band is guided between the pressure stamp and a counter pressure body,
  at least one tempering device for keeping the raw fiber band within a processing temperature range above the polymer melting point until the completion of the pressure shearing vibration.

According to the invention it has been recognized that a melt application with subsequent pressure shearing vibration, provided the raw fiber band is at a temperature that is above the polymer melting point, results in an effective incorporation of the polymer melt into the entire fiber volume structure of the raw fiber band. By means of the pressure shearing vibration volumes of gas still present in the raw fiber band are driven out effectively. The method can be performed continuously. The product of the method can be an impregnated continuous fiber band. A continuous raw fiber band can be used as the starting material. Keeping the raw fiber band at a temperature above the polymer melting point ensures that the polymer does not solidify in an undesirable manner prior to the complete penetration of particles into and onto the raw fiber band. It is possible to continue to keep the temperature above the polymer melting point after completing the pressure shearing vibration even during a period of rest. After performing the given method steps the produced, impregnated fiber band can be cooled in a specified manner. The fiber band can comprise a plurality of continuous fibers. Alternatively or in addition it is possible to use a fabric band as the fiber band, in which individual fibers are provided which are oriented in directions other than longitudinal direction. Also another band-like fiber structure, for example a non-woven fabric, or a textile structure can be used as the fiber band. Owing to the pressure shearing vibration there is very little or no damage to the fibers and good polymer penetration of the fiber band, i.e. good impregnation.

A method, in which the provided raw fiber band is made from a plurality of rovings brought together, wherein for specifically separating individual filaments within the individual rovings the raw fiber band treated with a sizing preparation is firstly charged with a shearing force with force component perpendicular to the band plane enables a desired "opening" of the rovings forming the raw fiber band. The filaments or individual fibers inside the rovings which are stuck together because of the sizing preparation become detached from one another in this way so that the polymer melt can penetrate between the individual fibers. The application of force can be performed after the rovings have been brought together to form a raw fiber band.

A method comprising the following steps for providing the raw fiber band,
  providing a plurality of rovings on a plurality of roving bobbins,
  removing the rovings from the roving bobbins and bringing the rovings together to form a raw fiber band. The method is particularly suitable for producing a continuous fiber band.

A method, in which the polymer is applied onto the raw fiber band whilst the raw fiber band is conveyed under normal environmental pressure avoids the complex sealing of a pressurized application chamber from the outside. Surprisingly, it has been found that the application of pressure shearing vibration according to the invention enables the application of a polymer under normal environmental pressure.

A method, in which the application of pressure shearing vibration on a section of the raw fiber band is performed after the application of the polymer multiple times in succession along the processing path increases the efficiency of the method of production. Transverse movement components of the various different pressure shearing vibration application devices can be synchronized to work in opposite direction, i.e. in differential mode. Between consecutive applications of pressure shearing vibrations a defined rest period can be provided, in which the raw fiber band is not loaded with pressure and/or shearing vibration during a predefined time interval.

A method, in which the application of pressure shearing vibration on a section of the raw fiber band is performed after the application of the polymer from both sides of the band plane can be performed by means of pressure application devices, which are arranged in succession in the processing path. Alternatively, it is possible to apply pressure shearing vibration simultaneously from both sides. The application of pressure shearing vibration from both sides can be performed by a synchronized inversion of the transverse movement components, i.e. in a controlled differential mode.

The advantages of a device for producing a composite fiber material in the form of a fiber band impregnated with a polymer comprising:
- a transport device for supplying a raw fiber band and for transporting the fiber band along a processing path,
- a preheating device for preheating the raw fiber band to a processing temperature which is higher than a melting point of the polymer,
- an application device for applying the melted polymer onto the whole width of the raw fiber band on a surface of the raw fiber band,
- at least one pressure shearing vibration application device which comprises at least one pressure stamp for the application of pressure onto the raw fiber band perpendicular to the band plane after the application of the polymer by the pressure stamp with the simultaneous application of the shearing vibration of the pressure stamp having a vibration movement component (y) in the band plane and transversely to a band running direction, wherein the raw fiber band is guided between the pressure stamp and a counter pressure body,
- at least one tempering device for keeping the raw fiber band within a processing temperature range above the polymer melting point until the completion of the pressure shearing vibration, correspond to those that have already been explained above with reference to the method according to the invention. To pull off rovings a creel with bobbins can be used onto which the individual rovings are wound. The production device can comprise a joining device for joining the rovings together to form a raw fiber band. Along the processing path in a specific manner guiding elements can be provided for guiding the raw fiber band. The guiding elements can be heated. The production device can have a cooling device after the completion of the pressure shearing vibration and possibly a subsequent rest period. The cooling device can be configured as a pair of rollers and can comprise additional cooling plates. A tempering device for holding the raw fiber band at a temperature above the polymer melting point can be integrated into the pressure shearing vibration application device. A tempering device of this kind can be coupled for example to the counter pressure body. Frequencies of the pressure shearing vibration can be in a range of between 1 Hz and 40 kHz. Amplitudes of the shearing vibration application can be in a range of between 0.1 mm and 5 mm. The pressure of the pressure shearing vibration application can be in a range of between 0.01 MPa and 2 MPa.

A device, comprising a shearing force application device which is arranged in the processing path ahead of the application device which is configured such that for the specific separation of individual filaments within individual rovings the raw fiber band treated with a sizing preparation is firstly charged with a shearing force (S) with force component perpendicular to a band plane (xy), in particular before the rovings forming the raw fiber band are brought together to form the raw fiber band enables the efficient "opening" of the raw fiber band. The shearing force application device can comprise a plurality of rollers arranged consecutively in the processing path of the raw fiber band, over which rollers the raw fiber band is guided in a zigzag. The shearing force application device can also be arranged downstream of bringing together the rovings forming the raw fiber band. The shearing force acts in the shearing application device generally with a force component transversely to the band plane of the fiber band. This working direction is different than the main working direction during the pressure shearing vibration application, in which the shearing is mainly performed in the band plane.

A device, in which the application device has a wide slot nozzle enables the efficient application of the polymer melt onto the raw fiber band. The wide slot nozzle can be arranged at the output of an extruder for melting the polymer. Two wide slot nozzles can be provided that are opposite one another on both sides of the band plane, by means of which the polymer melt is applied onto the raw fiber band from both sides.

A device, in which the pressure shearing vibration stamp has a stamp head with a run-in section, a pressure shearing vibration application section and a run-out section enables the effective incorporation of the polymer melt into the raw fiber band. A profile of the stamp head can be configured to be symmetrical, so that the run-in section and the run-out section have the same profiling. Alternatively, it is also possible to have an asymmetrical profiling of the stamp head.

At the same time in a device, comprising opposite pressure shearing vibration stamps, wherein the application of pressure shearing vibration on a section of the raw fiber band is performed after the application of the polymer from both sides by the two opposite pressure shearing vibration stamps, those pressure shearing vibration stamps have the function of counter pressure bodies.

A device, in which the counter pressure body is coupled to a tempering device at the same time leads to a desired tempering of the raw fiber band above the polymer melting point.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
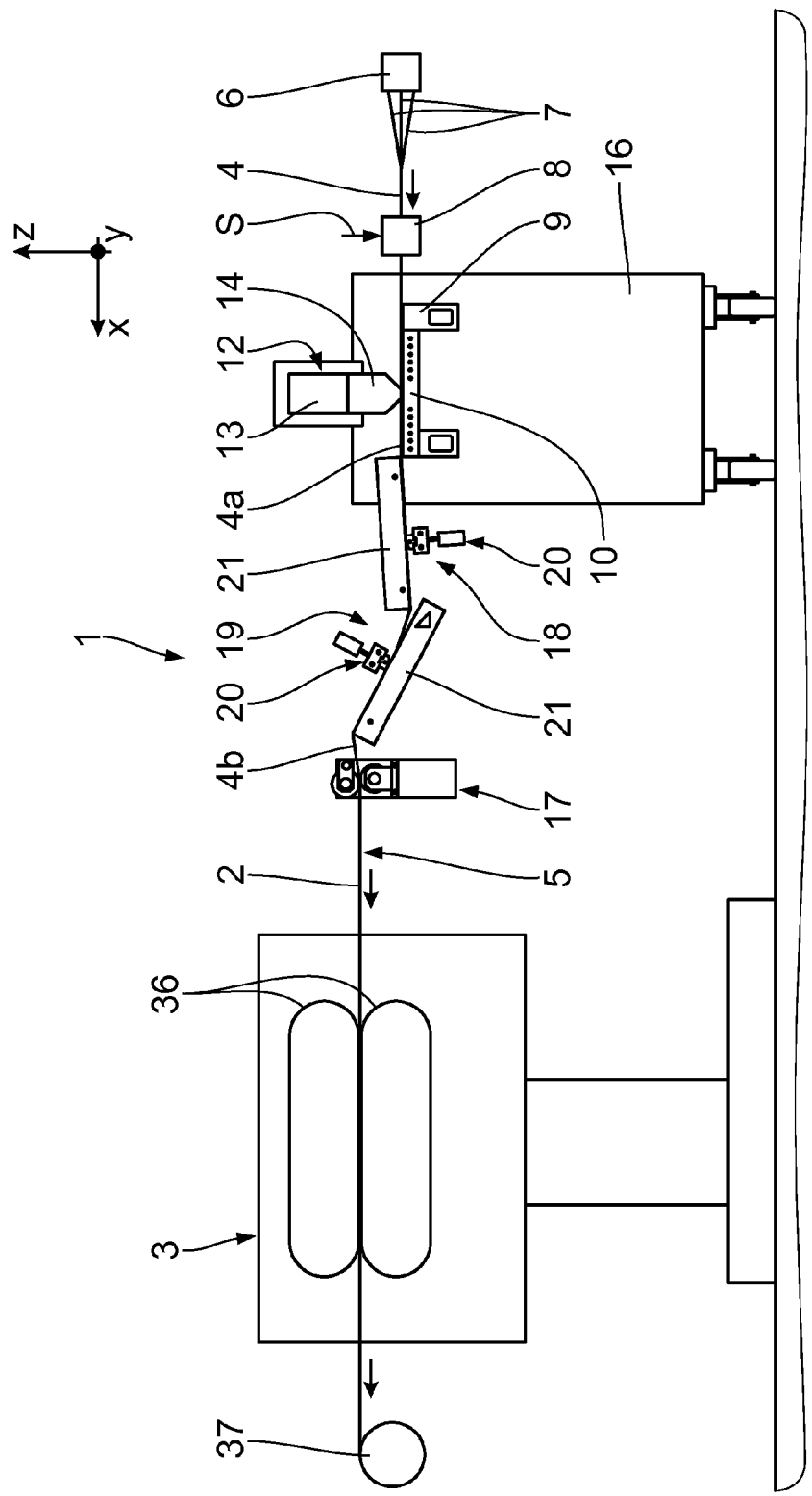
FIG. 1 is a side view of a device for the production of a composite fiber material in the form of a fiber band impregnated with a polymer.

A device 1 is used for the production of a composite fiber material in the form of a fiber band 2 impregnated with a polymer which is also referred as tape.

The production device 1 has a transport device 3 for supplying a raw fiber band 4 or fiber strip to processing components of the production device 1 and for transporting the fiber band 4, 2, i.e. firstly the raw fiber band 4 and later the produced, impregnated fiber band 2, along a processing path 5. As long as the end processing state, i.e. the tape (fiber band 2), has not yet been reached the term raw fiber band (fiber band 4) will be used in the following. The transport speed of the fiber band 2, 4 along the processing path 5, which is defined by the transport device 3, is in the range of between 2.5 m/min to 25 m/min, in particular in the range of from 7.5 m/min to 25 m/min. The conveying direction of the fiber band 4, 2 along the processing path 5 is indicated in FIG. 1 by a plurality of arrows.

The raw fiber band 4 has a width in y-direction in the range of between several millimeters and 300 mm. Also even greater widths of the raw fiber band 4 in y-direction are possible. The raw fiber band 4 has a thickness in z-direction of about 0.5 mm. Glass fibers, carbon fibers, aramid, basalt, polyester or natural fibers can be used as the fiber material for the raw fiber band 4.

The processing path 5 begins at the bobbins, not shown in FIG. 1, of a schematically shown creel 6. From there rovings 7 or fibers which are provided on a plurality of roving bobbins of the creel 6 are drawn off by means of the transport device 3 and brought together into a raw fiber band 4 in a manner not shown in detail. The rovings 7 are endless multi-filaments without twist. Several kilograms of rovings 7 are wound onto the bobbins of the creel 6. The bobbins of the creel 6 are pulled under constant tension. The rovings 7 are supplied to the converging device without any rotation. During convergence the rovings 7 are laid next to one another to form the raw fiber band 4. The raw fiber band 4 has over its width a constant fiber density, i.e. over the y-dimension, within a predefined tolerance range.

The rovings 7 of the raw fiber band 4 are treated with a sizing preparation, known as size. After bringing together the rovings to form the raw fiber band 4 the latter runs through an opening device 8, which is also shown schematically in FIG. 1. The opening device 8 represents a shearing force application device. There the raw fiber band is charged specifically with a shearing force S firstly for the detachment of individual filaments within the individual rovings 7 by a force component perpendicular to the band plane. The opening device 8 can be arranged, as indicated in FIG. 1, after bringing together the rovings in the processing path 5, but also alternatively ahead of bringing together the rovings.

To clarify the relative positions a Cartesian xyz coordinate system is used in the following. The x-direction runs to the left in FIG. 1. In FIG. 1 the y-direction runs perpendicular to the plane of the drawing and out of the latter. The z-direction runs upwards in FIG. 1.

The opening device 8 can be formed by a plurality of rollers arranged behind one another, which run in y-direction, i.e. transversely to the band running direction x and which are encircled by the raw fiber band 4 in a meandering or zigzag form.

From the converging of the rovings the raw fiber band 4, which in this processing stage is also known as dry fiber band, is conveyed firstly parallel to the x-direction. The band plane of the raw fiber band 4 runs parallel to the xy-plane.

After the opening device 8 and after bringing together the rovings to form the raw fiber band 4 the latter is guided parallel to the x-direction past a contact preheating device 9. The latter has a contact body 10 (cf. FIG. 3), which is heated by means of a heating unit with heating elements 11 to a desired preheating temperature. The heating elements 11 are in the form of a plurality of heating rods running behind one another in the processing path 5 and transversely to the processing path, which together form the contact body 10. Along the contact body 10 the raw fiber band 4 is in heat-transmitting, mechanical contact with the latter. The desired preheating temperature is selected so that the raw fiber band 4 is preheated by contact with the contact body 10 to a processing temperature which is higher than a melting point of the impregnating polymer.

On the side of the raw fiber band 4 opposite the contact body 10 of the contact preheating device 9 an application device 12 is arranged. The application device 12 is used for the application of the polymer in a melt volume 13 on a total y-width of the raw fiber band 4 on a surface 13a of the raw fiber band 4.

As the impregnating polymer a thermoplastic material can be used. Examples thereof are PE (polyethylene), PP (polypropylene), other polyolefins and blends of said polyolefins, SAN (styrene-acrylonitrile), PA (polyamide), for example PA 6, PA 6.6, PA 6.6T, PA 12, PA 6.10, ASA (acrylonitrile/styrene/acrylate ester), PC (polycarbonate), PBT (polybutylene terephthalate), PET (polyethylene terephthalate), PPS (polyphenylene sulfide), PSU (polysulfone), PES (polyethersulfone), PEEK (polyether ether ketone) or polymer blends, for example PC/PBT. As the impregnating polymer a duroplastic material can also be used, which can be applied as a melt in the B-stage (Resitol).

The application device 12 has a wide slot nozzle 14. The latter is in fluid connection with the melt volume 13 via a nozzle channel 15. The melt volume 13 represents an outlet volume of an extruder 16 of the production device 1. On the basis of the preheating of the raw fiber band 4 by the contact preheating device 9 and on the basis of further heating of the fiber band 4, 2 via additional tempering devices the applied impregnating polymer remains on the raw fiber band 4 during the further course of the processing path 5 up to a cooling device 17 arranged ahead of the transport device at a processing temperature which is higher than a melting point of impregnating polymer.

After the application of the impregnating polymer the raw fiber band 4 is also denoted as a coated fiber band or as a polymer-coated fiber band 4*a*.

The wide slot nozzle 14 is arranged in the arrangement according to FIG. 1 above the raw fiber band 4 and contact body 10 is arranged underneath the raw fiber band 4.

The application of the polymer melt via the wide slot nozzle 14 onto the raw fiber band 4 is performed without excess polymer, so that the distribution of the polymer melt onto the whole surface of the raw fiber band 4 is even, i.e. in particular over the entire y-width of the raw fiber band 4, within predefined tolerances.

The pressure in the environment at the site of application of the melted impregnating polymer onto the raw fiber band 4 is normal. As soon as the impregnating polymer has left the wide slot nozzle 14 the impregnating polymer is no longer under excess pressure.

To the application device in the further processing path 5 of the raw fiber band 4 two pressure shearing vibration application devices 18, 19 are arranged behind another. The two pressure shearing vibration application devices 18, 19 are identical in structure, apart from their spatial position, which is why it is sufficient in the following to describe the first pressure shearing vibration application device 18 in more detail.

Figure 5:
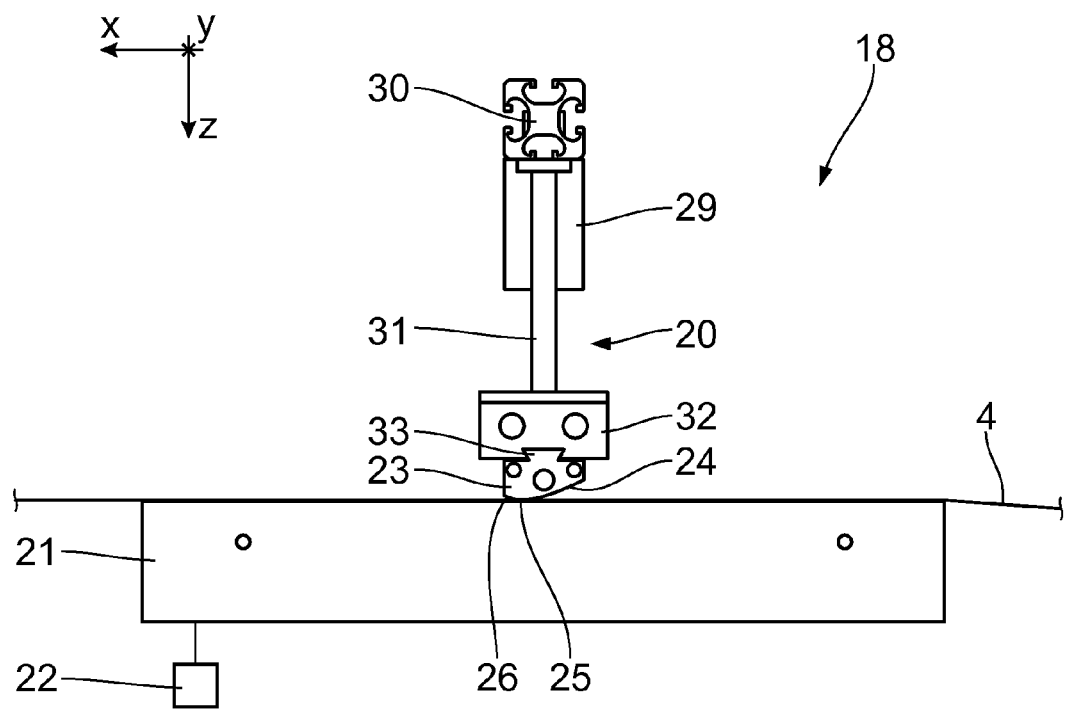
FIG. 5 is a side view of one of the pressure shearing vibration application devices.

FIG. 5 shows the main components of the pressure shearing vibration application device 18. The latter has a pressure shearing vibration stamp 20. The latter is used for the application of pressure (pressure force $F_D$) onto the polymer-coated raw fiber band 4 perpendicular to its band plane. The pressure shearing vibration stamp 20 exerts pressure approximately in positive z-direction. At the same time as the pressure application a shearing vibration application of the pressure shearing vibration stamp 20 takes place with a vibration movement component in y-direction, i.e. with a vibration movement component in the band plane and transversely to the band running direction (x-direction).

As the vibration drive for vibration in y-direction it is possible to use an eccentric mechanism, a pendulum lift mechanism, a pneumatic cylinder, a hydraulic cylinder, an electromagnetic exciter or a piezoelectric exciter.

During processing by the shearing vibration application device 18 the raw fiber band 4 is guided between the pressure stamp 20 and a counter pressure body 21. The counter pressure body 21 is heated by means of a tempering device 22 shown in FIG. 5 to a desired temperature, so that the raw fiber band 4, where it comes into contact with the counter pressure body 21, is kept at a processing temperature which is higher than the melting point of the impregnating polymer. The raw fiber band 4 is thus kept until after the completion of the pressure shearing vibration application at this processing temperature or a processing temperature range which is greater than the melting point of the impregnating polymer.

The pressure shearing vibration stamp 20 has a stamp head 23, which during the pressure shearing vibration application comes into contact with the raw fiber band 4. The stamp head 23 is also denoted as a stamp shoe. A contact surface of the stamp head 23 is profiled and along the processing path 5 has a run-in section 24, a pressure shearing vibration application section 25 and a run-out section 26. The run-in section 24 is configured as an oblique surface, so that the distance between the stamp head 23 and the raw fiber band 4 narrows continually in conveying direction along the processing path 5. The pressure shearing vibration application section 25 is configured to be planar and runs parallel to a contact surface 27 of the counter pressure body 21 which is also configured to be planar. The run-out section 26 is also configured as an oblique surface and is shaped so that the distance between the stamp head 23 and the raw fiber band 4 increases continuously in conveying direction along the processing path 5. Overall the stamp head 23 is configured to be convex.

The pressure shearing vibration application is performed by means of the pressure shearing vibration stamp 20 over the whole width of the raw fiber band 4 and is performed transversely to the band running direction.

A pressure force $F_D$ of the pressure shearing vibration application device 18 is produced by a pressure piston 28 of a pressure source 29 in the form of a pneumatic cylinder. The pressure exerted by the stamp head 23 on the raw fiber band is within a range of between 0.01 and 2 MPa.

The vibration of the stamp head 23 in +/−y-direction is performed at a predeterminable frequency in a range of between 1 Hz to 40 kHz. A vibration amplitude of the stamp head 23 in y-direction is 5 mm (+/−2.5 mm). In the shown embodiment the vibration amplitude is 5 mm and the vibration frequency 5 Hz.

The stamp head 23 is guided movably on a support body 30 of the pressure shearing vibration application device 18 via two guiding rods 31 running along the z-direction.

A vibration application of the stamp head 23 can be performed by means of a piezo drive, which is accommodated in a coupling body 32, to which the stamp head 23 is connected mechanically by a dovetail guide 33.

Figure 3:
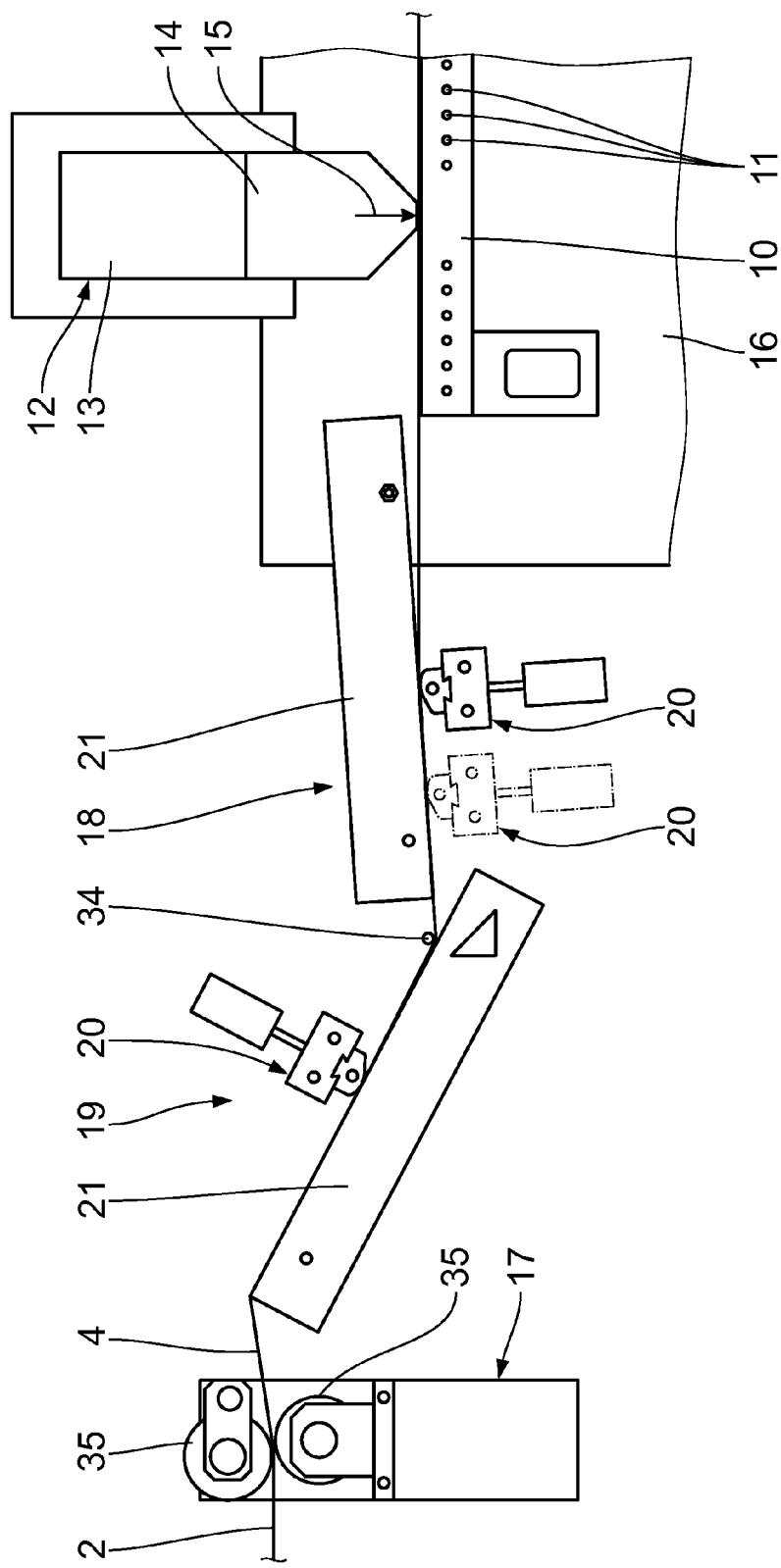
FIG. 3 is an enlarged view of a section of FIG. 1 in the area of two consecutively arranged vibration pressure application devices of the production device.
Figure 4:
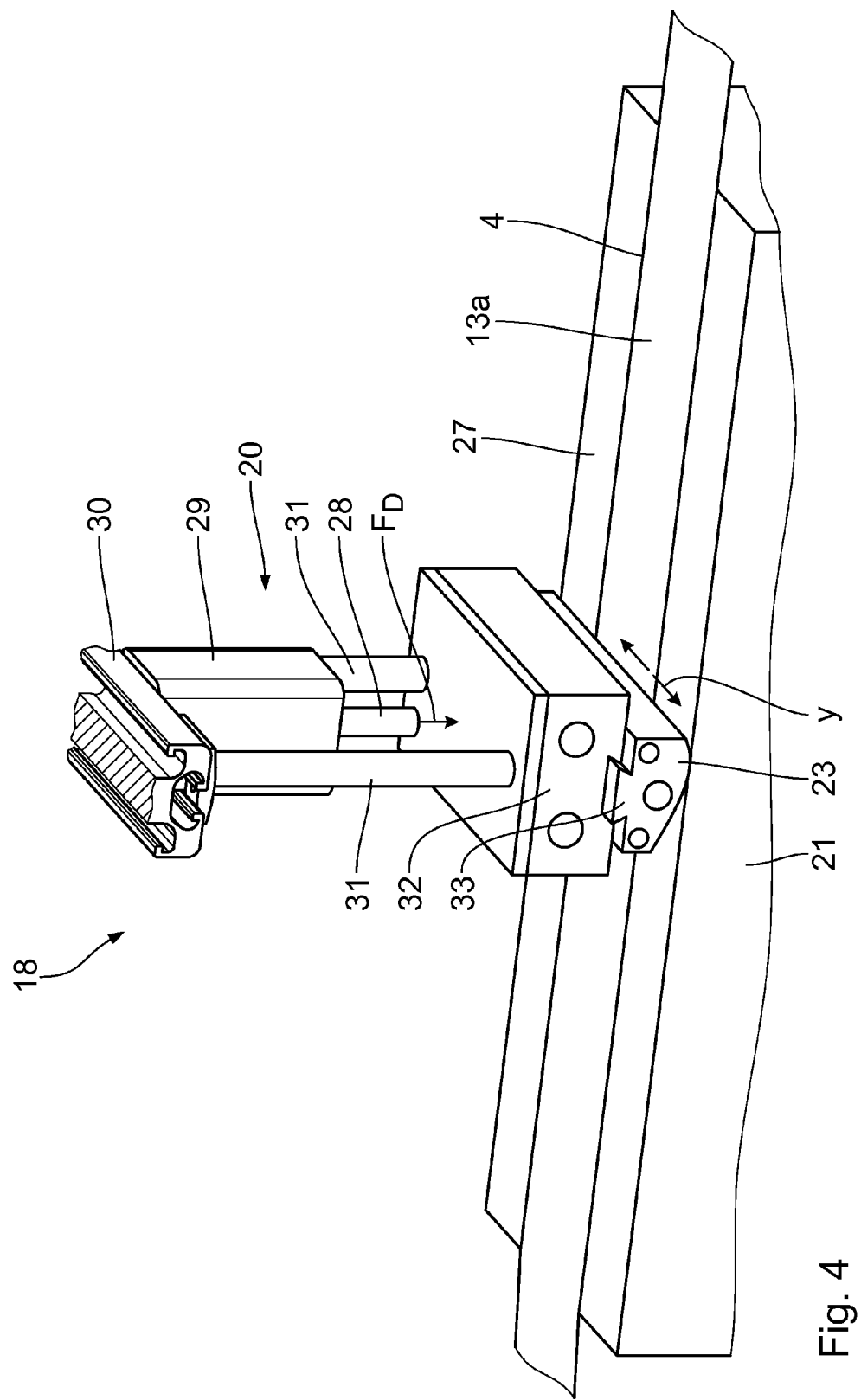
FIG. 4 is a perspective detailed view of one of the pressure shearing vibration application devices.

Between the two pressure shearing vibration application devices 18 the raw fiber band 4 is guided by a guiding edge, which is formed either by the counter pressure body 21 of the pressure shearing vibration application device 18 or by a deflecting element 34 represented schematically in FIG. 3. The deflecting element 34 can be configured as a heated spike. A plurality of such guiding elements 34 can be provided along the processing path 5 of the polymer-coated raw fiber band 4.

The pressure shearing vibration stamps 20 of the two pressure shearing vibration application devices 18, 19 lie opposite one another in relation to the band plane of the raw fiber band 4 along the processing path 5 such that the pressure shearing vibration application of a section of the raw fiber band 4 conveyed along the processing path 5 after the application of the impregnating polymer from both sides of the raw fiber band 4 is performed by the two pressure shearing vibration stamps 20 of the two pressure shearing vibration application devices 18, 19.

In an alternative embodiment of the pressure shearing vibration application also in the processing path 5 pressure shearing vibration stamps 20 can be provided arranged one after the other on the same side of the raw fiber band 4. An embodiment of this kind is shown by dashed lines in FIG. 3.

After completing the pressure shearing vibration application the raw fiber band 4 is also denoted as an impregnated fiber band 4*b*.

The cooling device 17 has two cooling calibrating rollers 35 running opposite one another, through which the impregnated fiber band runs. After running through the rollers 35 the finally impregnated fiber band 2 is formed from the impregnated raw fiber band 4. On the basis of the cooling of the fiber band 2 to a temperature below the polymer melting point the fiber band 2 is solidified, i.e. consolidated.

By means of the two cooling calibrating rollers 35 the fiber band 2 can be guided with or without width delimitation, i.e. with or without lateral delimitation in y-direction. In connection with the two rollers 35 the cooling device 17 can still have cooling plates which are not shown in the drawing and by means of which the fiber band 2 experiences further cooling with-out pressure.

Figure 2:
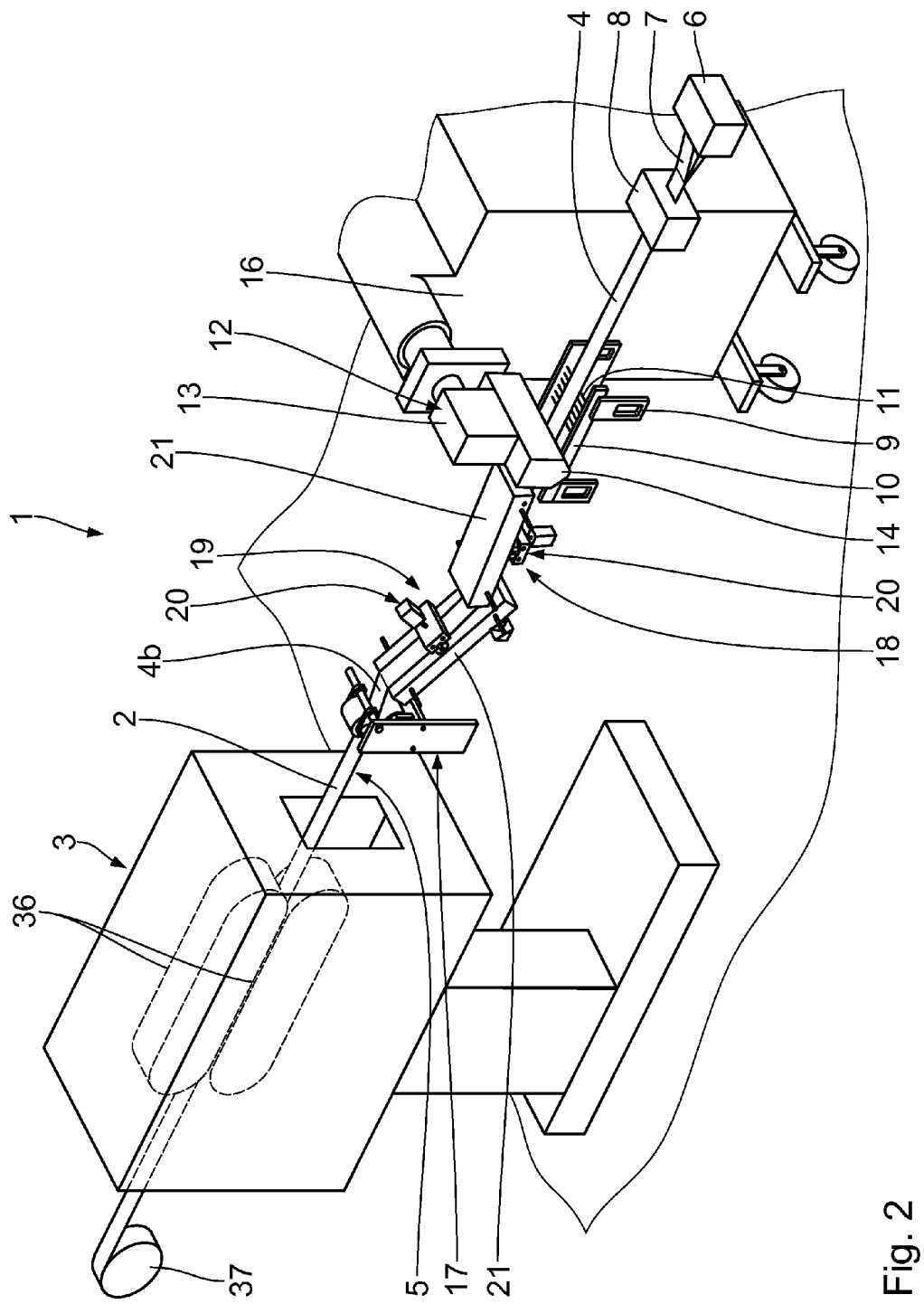
FIG. 2 is a perspective view of a section of the device according to FIG. 1 which show details of the guiding of the fiber band more clearly.

After the cooling device 17 the fiber band 2 runs through two continuous transport bands 36 of the transport device 3 running in opposite directions. After running through the transport device 3 the impregnated fiber band 2 is wound round a roller 37 shown schematically in FIG. 2.

During the production of the fiber band 2 impregnated with the impregnating polymer first of all the bobbins are provided on the creel 6 with the individual rovings. After drawing off the rovings the latter are brought together to form the raw fiber band 4 and are opened by the opening device 8. The opening causes the impregnating polymer to penetrate between the individual fibers, without being hindered by rovings caked together by sizing preparation. The raw fiber band 4 is then preheated by the contact preheating device 9 firstly to the processing temperature, which is greater than the melting point of the impregnating polymer. Afterwards by means of the application device 12 the melted impregnating polymer is applied onto the entire width of the raw fiber band 4 on its surface 13*a*. This application is performed whilst the raw fiber band is conveyed under normal environmental pressure along the processing path 5 by the transport device 3. The applied, liquid impregnating polymer then penetrates into the raw fiber band 4 until air enclosed in the raw fiber band 4 makes further and complete penetration difficult. Afterwards by means of the pressure shearing vibration application device 18 in FIG. 1 from below and subsequently by means of the pressure shearing vibration application device 19 in FIG. 1 from above pressure is applied onto the raw fiber band perpendicular to its band plane by the pressure stamps 20 with the simultaneous shearing vibration of the pressure shearing vibration stamps 20. A vibration movement component of this vibration application runs in y-direction, i.e. in the xy-band plane and transversely to the band running direction x. During the vibration application the raw fiber band 4 is guided between the respective pressure stamp 20 and the respective pressure counter body 21. During the shearing vibration application the tempering devices 22 hold the counter pressure bodies 21 and by means of the mechanical heat contact keep the raw fiber band 4 at the processing temperature until the completion of the pressure shearing vibration application.

A temperature of the raw fiber band 4 of 380° C. is not exceeded. With specific, particularly temperature-resistant materials, a higher heating temperature can also be used, for example 400° C. Even higher heating temperatures are possible for the raw fiber band 4.

The shearing of the polymer melt transversely to the fibers of the raw fiber band 4 during the pressure shearing vibration application improves the wetting of the individual fibers on the action area of the pressure shearing vibration application. Said action area corresponds to the expansion of the pressure shearing vibration application section 25 and in the embodiment according to FIG. 5 is in the region of between 10 mm and 50 mm.

By means of the pressure shearing vibration application the raw fiber band 4 is ventilated efficiently, so that the liquid impregnating polymer can penetrate into practically all of the intermediate spaces between the individual filaments of the rovings of the raw fiber band 4. The raw fiber band 4 is impregnated in this way completely and evenly and practically without any residual air pockets. Accordingly porosity is low, i.e. residual air volume inside the impregnated fiber band 2 in relation to the fiber band volume. This porosity can be in the range of between 0 and 10 vol %, in particular between 0 and 5 vol %.

After the impregnation the fiber content is 35 vol % to 65 vol % in the fiber band 2.

The frequency, the amplitude and the pressure of the pressure shearing vibration application are parameters which are adjusted to the material combination to be processed. The fiber material of the raw material band 4, the thickness and the width of the raw fiber band 4, the diameter of the individual fibers, the material of the impregnating polymer and the application amount of the impregnating polymer per area of the raw fiber band 4 also play a role. The properties of the rovings or fibers from which the raw fiber band 4 is composed also play an important role.

By means of the application of pressure shearing vibration via the two pressure stamps from both sides of the raw fiber band 4 there is an effective incorporation of the impregnating polymers inside the raw fiber band 4, i.e. between the fibers running in the volume of the raw fiber band 4.

Between the plurality of consecutive possible pressure shearing vibration applications the raw fiber band 4 runs along the processing path 5 without pressure loading which is also denoted as a "resting period". In said resting periods the polymer melt is given the chance to distribute itself evenly between the fibers of the raw fiber band 4.

The polymer melt viscosity, i.e. the Melt Flow Index (MFI) is in the range of between 10 and 150 g/min and in particular in the range of between 30 and 50 g/min. MFI values of less than 10 g/min are also possible. Polymer melts can be processed with MFI values of in the range of between 25 and 75 g/min and also in the range of between 5 and 25 g/min, i.e. relatively highly viscous, polymer melts.

The difference between the fiber temperature and the melt temperature when the polymer melt meets the raw fiber band at the exit of the wide slot nozzle 14 is in a range of between −20 K and +50 K. In principle, this difference is maintained at an absolute value which is as low as possible.

Figure 6:
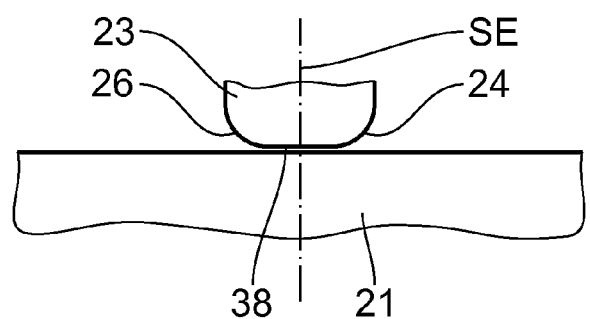
FIG. 6 is a side view corresponding to FIG. 5 showing, schematically and in broken form, an alternative profile of a pressure shearing vibration stamp for the pressure shearing vibration application device.
Figure 7:
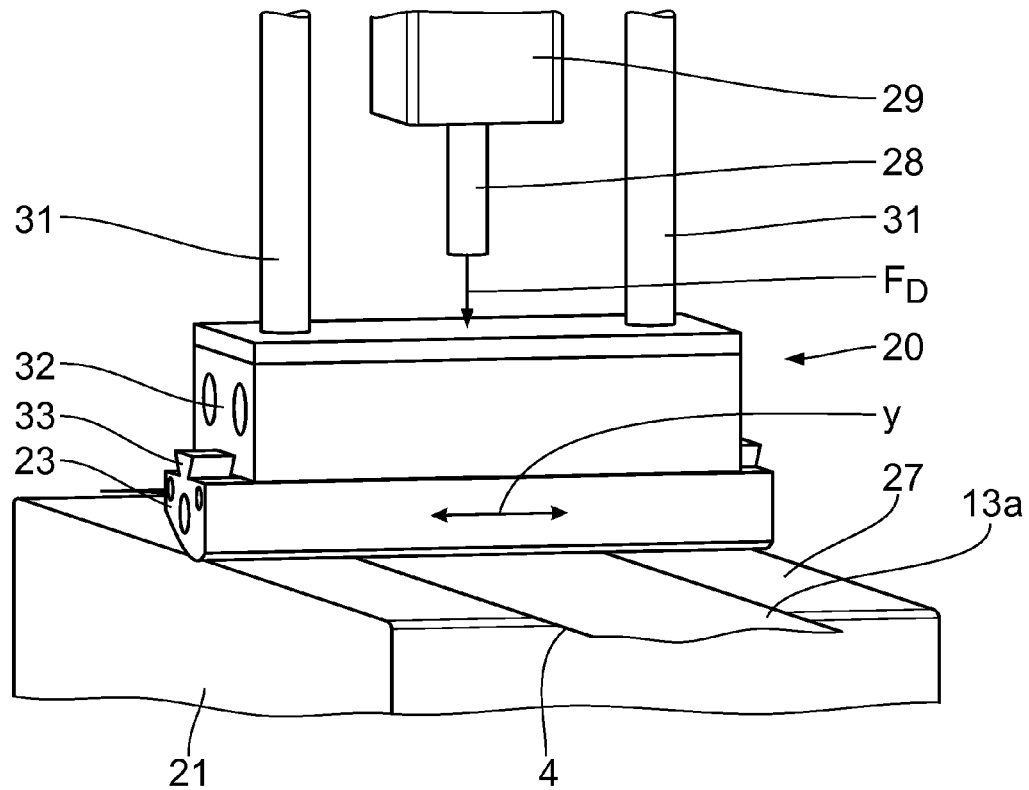
FIG. 7 is a detailed view of one of the pressure shearing vibration application devices from a further perspective.

FIG. 6 shows a variant of a profiling for the stamp heads 23 of the pressure stamps 20 of the pressure shearing vibration application devices 18 and 19. Components, which correspond to those which have already been explained above with reference to the pressure shearing vibration application devices 18, 19 have the same reference numbers and will not be discussed again in more detail.

The profile of the alternative pressure stamp 23 is, unlike the asymmetric profile of the pressure stamp 23 according to FIGS. 1 to 5, mirror symmetrical about a plane of symmetry parallel to the yz-plane SE. The run-in section 24 is shaped accordingly in the same way and is profiled like the run-out section 26. A pressure shearing vibration application section 38 of the alternative pressure stamp 23 is designed to be planar and parallel to the counter surface of the counter pressure body 21, wherein the x-extension of the pressure shearing vibration application section 38 is greater than that of the pressure shearing vibration application section 25 of the configuration according to FIGS. 1 to 5.

Figure 8:
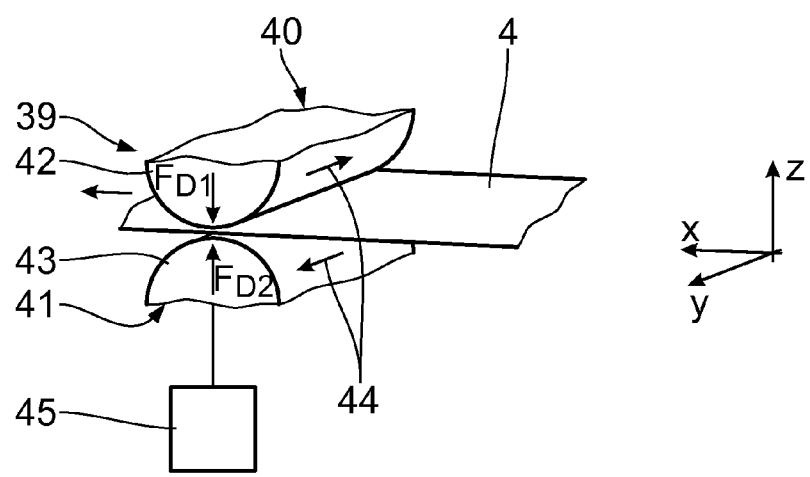
FIG. 8 is a perspective view of details of a variant of a pressure shearing vibration application device in the region of two opposite pressure shearing vibration stamps.

FIG. 8 shows an alternative variant of a pressure shearing vibration application device 39, which can be used instead of the pressure shearing vibration application devices 18, 19. The pressure shearing vibration application device 39 is shown in the region of two opposite pressure shearing vibration stamps 40, 41, where the representation is broken and in perspective. The pressure shearing vibration stamps 40, 41 have two convex stamp heads 42, 43. The raw fiber band 4 runs between said convex stamp heads 42, 43. The section of the raw fiber band 4 lying between the two stamp heads 42, 43 is subjected to pressure shearing vibration from both sides by the opposing pressure shearing vibration stamps 40, 41. In this case the stamp head 42 exerts a pressure force $F_{D1}$ in negative z-direction and the stamp head 43 exerts a pressure force $F_{D2}$ in positive z-direction on the raw fiber band 4. The stamp head 43 represents the counter pressure body for the stamp head 42 and vice versa. Each of the stamp heads 42, 43 exerts an absolute pressure on the raw fiber band 4 in a range of between 0.005 and 1 MPa.

The pressure shearing vibration application device 39 is configured so that transverse movement components of the stamp heads 42, 43 of the pressure shearing vibration stamps 40, 41 act synchronously in opposite direction during the pressure shearing vibration application on the raw fiber band 4. The two stamp heads 42, 43 thus operate in differential mode, as indicated by directional arrows 44 running along the y-direction in FIG. 8. When the stamp head 42 during the vibration is deflected in negative y-direction the opposite stamp head 43 is deflected in positive y-direction and vice versa.

A corresponding synchronized contra effect of the transverse movement components (+/−y) of the pressure shearing vibration stamps 20 can also be provided directly behind one another in the arrangement of the pressure stamp 20 which is indicated by a dashed line in FIG. 3.

At least one of the stamp heads 42, 43 is equipped with a tempering device 45 according to the type of tempering device 22 for the counter pressure body 21 so that the raw fiber band 4 during the pressure shearing vibration application by the pressure shearing vibration application device 39 is kept at the processing temperature, which is greater than the melting point of the impregnating polymer.

While specific embodiments of the invention have been shown and described in detail to illustrate the application of the principles of the invention, it will be understood that the invention may be embodied otherwise without departing from such principles.

The invention claimed is:

1. A method for producing a composite fiber material in the form of a fiber band impregnated with a polymer, the method comprising the following steps:
    providing a raw fiber band and conveying the raw fiber band along a processing path;
    preheating the raw fiber band to a processing temperature which is higher than a melting point of the polymer;
    applying a melted polymer to a whole width of the raw fiber band on a surface of the raw fiber band;
    applying pressure to the raw fiber band perpendicular to a band plane of the band after applying the melted polymer, wherein the pressure is applied by at least one pressure stamp with simultaneous application of shearing vibration of the at least one pressure stamp having a vibration movement component in the band plane and transversely to a band running direction;
    keeping the raw fiber band within a processing temperature range above the polymer melting point at least until completion of the pressure-shearing vibration.

2. A method according to claim 1, wherein the raw fiber band is made from a plurality of rovings brought together, wherein for specifically separating individual filaments within individual rovings the raw fiber band treated with a sizing preparation is firstly charged with a shearing force with a force component perpendicular to the band plane.

3. A method according to claim 1, wherein providing the raw fiber band comprises the following steps:
    providing a plurality of rovings on a plurality of roving bobbins;
    removing the rovings from the roving bobbins and bringing the rovings together to form said raw fiber band.

4. A method according to claim 1, wherein the melted polymer is applied onto the raw fiber band while the raw fiber band is conveyed under normal environmental pressure.

5. A method according to claim 1, wherein the application of pressure shearing vibration on a section of the raw fiber band is performed after applying the melted polymer multiple times in succession along the processing path.

6. A method according to claim 1, wherein the application of pressure shearing vibration on a section of the raw fiber band is performed after applying the melted polymer from both sides of the band plane.

7. A device for producing a composite fiber material in the form of a fiber band impregnated with a polymer, the device comprising:
    a transport device for supplying a raw fiber band and for transporting the raw fiber band along a processing path;
    a preheating device for preheating the raw fiber band (4) to a processing temperature which is higher than a melting point of the polymer;
    an application device for applying a melted polymer onto a whole width of the raw fiber band on a surface of the raw fiber band;
    at least one pressure shearing vibration application device comprising at least one pressure stamp applying pressure onto the raw fiber band perpendicular to a band plane after applying the melted polymer by the at least one pressure stamp with simultaneous application of the shearing vibration of the at least one pressure stamp having a vibration movement component in the band plane and transversely to a band running direction, wherein the raw fiber band is guided between the at least one pressure stamp and a counter pressure body;
    at least one tempering device for keeping the raw fiber band within a processing temperature range above the melting point of the polymer until completion of the pressure shearing vibration.

8. A device according to claim 7, further comprising:
    a shearing force application device arranged in the processing path ahead of the application device which is configured such that for specific separation of individual filaments within individual rovings the raw fiber band treated with a sizing preparation is firstly charged with a shearing force with a force component perpendicular to said band plane.

9. A device according to claim 8, wherein the raw fiber band treated with the sizing preparation is firstly charged with the shearing force with the force component perpendicular to said band plane before the rovings forming the raw fiber band are brought together to form the raw fiber band.

10. A device according to claim 7, wherein the application device has a wide slot nozzle.

11. A device according to claim 7, wherein the at least one pressure shearing vibration stamp has a stamp head with a run-in section, a pressure shearing vibration application section and a run-out section.

12. A device according to claim 7, further comprising:
    another pressure stamp to provide a plurality of pressure shearing vibration stamps, said plurality of pressure shearing vibration stamps being arranged behind one another along the processing path.

13. A device according to claim 7, further comprising:
    another pressure stamp to provide two opposite pressure shearing vibration stamps, wherein application of pressure shearing vibration on a section of the raw fiber band is performed after applying the polymer from both sides by the two opposite pressure shearing vibration stamps.

14. A device according to claim 7, wherein the counter pressure body is coupled to a tempering device.

\* \* \* \* \*